(12) United States Patent
Farrell et al.

(10) Patent No.: US 8,260,823 B2
(45) Date of Patent: Sep. 4, 2012

(54) DISSEMINATION, ACQUISITION, DISCOVERY AND USE OF PEOPLE-ORIENTED FOLKSONOMIES

(75) Inventors: Joel Alan Farrell, Ashland, MA (US); John Kenyon Gerken, III, Raleigh, NC (US); James Michael Snell, Hanford, CA (US)

(73) Assignee: International Business Machines Corporation, Armonk, NY (US)

( * ) Notice: Subject to any disclaimer, the term of this patent is extended or adjusted under 35 U.S.C. 154(b) by 528 days.

(21) Appl. No.: 12/248,582

(22) Filed: Oct. 9, 2008

(65) Prior Publication Data
US 2010/0094818 A1    Apr. 15, 2010

(51) Int. Cl.
*G06F 7/00* (2006.01)
*G06F 17/30* (2006.01)
*G06Q 99/00* (2006.01)
*G06F 15/16* (2006.01)

(52) U.S. Cl. .......................... 707/803; 707/769; 705/319
(58) Field of Classification Search .................. 707/803, 707/769, 802; 705/319
See application file for complete search history.

(56) References Cited

U.S. PATENT DOCUMENTS

| | | | | |
|---|---|---|---|---|
| 7,930,197 | B2* | 4/2011 | Ozzie et al. | 707/776 |
| 2007/0016575 | A1* | 1/2007 | Hurst-Hiller et al. | 707/100 |
| 2007/0150487 | A1* | 6/2007 | Christian et al. | 707/100 |
| 2008/0040674 | A1* | 2/2008 | Gupta | 715/745 |
| 2008/0104032 | A1* | 5/2008 | Sarkar | 707/3 |
| 2009/0006442 | A1* | 1/2009 | Anderson et al. | 707/102 |
| 2009/0077124 | A1* | 3/2009 | Spivack et al. | 707/103 Y |
| 2010/0114953 | A1* | 5/2010 | Liu et al. | 707/771 |
| 2011/0106795 | A1* | 5/2011 | Maim | 707/769 |

OTHER PUBLICATIONS

Jay Pipes. Tagging and Folksonomy Schema Design for Scalability and Performance. http://dablog.ulcc.ac.uk/wp-content/uploads/2007/12/tagging_folksonomy.pdf. MySQL, Inc., Dec. 2007, 40 pages.*

Niwa, Web Page Recommender based on Folksonomy Minign for ITNG '06 Submissions, Information Technology: New Generations, 2006.

Huberman, "Social Dynamics in Cyberspace," la-webb, pp. xvii, Third Latin American Web Congress (LA-WEB'2005), 2005.

* cited by examiner

*Primary Examiner* — Greta Robinson
*Assistant Examiner* — Brian E Weinrich
(74) *Attorney, Agent, or Firm* — Yudell Isidore Ng Russell PLLC (57) ABSTRACT

In a method of and system for discovering people with attributes, users tag people in their respective contact lists with attribute tags. The method aggregates in a folksonomy database the people tagged in the contact lists. A user may request a list of people tagged with an attribute. In response to a user request, the method searches the folksonomy database for people tagged with the attribute tag. The method returns to the requesting user a list of people tagged with the attribute tag.

18 Claims, 6 Drawing Sheets

TAGGING TABLE

| TAG | PERSON_ID | VALUE | CREATOR_ID | PRIVATE |
|---|---|---|---|---|
| DATABASE | ALBERT A. | 7 | WALKER W. | NO |
| DATABASE | ALBERT A. | ... | ... | ... |
| DATABASE | SANDERS S. | 8 | ROBERTS R. | NO |
| ... | ... | ... | ... | ... |
| DIFFICULT | BONDS B. | 10 | ANDREWS A. | YES |
| DIFFICULT | BONDS B. | 10 | MARTIN M. | YES |
| DIFFICULT | BONDS B. | ... | ... | ... |
| ... | ... | ... | ... | ... |
| PCI EXPRESS | BANNER B. | 10 | JONES T. | NO |
| PCI EXPRESS | BANNER B. | 7 | KENT C. | NO |
| PCI EXPRESS | BANNER B. | 8 | SMITH S. | NO |
| PCI EXPRESS | BANNER B. | ... | ... | ... |
| PCI EXPRESS | KENT C. | 6 | BANNER B. | NO |
| PCI EXPRESS | KENT C. | 8 | LAMAR L. | NO |
| ... | ... | ... | ... | ... |

FIG. 3

| PERSON_ID | EMAIL ADDRESS | AVAILABLE | ... |
|---|---|---|---|
| ALBERT A. | ALBERT@ABC.COM | NO | ... |
| ... | ... | ... | ... |
| BANNER B. | BANNER@ABC.COM | YES | ... |
| ... | ... | ... | ... |
| JONES T. | JONES@ABC.COM | YES | ... |
| ... | ... | ... | ... |
| ROBERTS R. | ROBERTS@ABC.COM. | NO | ... |
| ... | ... | ... | ... |

DISSEMINATION, ACQUISITION, DISCOVERY AND USE OF PEOPLE-ORIENTED FOLKSONOMIES

BACKGROUND OF THE INVENTION

1. Technical Field

The present invention relates generally to the field of collaboration, and more particularly to a method of disseminating, acquiring, discovering, and using information about people using people-oriented folksonomies.

2. Description of the Related Art

Tagging, as a means of providing metadata about Web-based resources, is standard practice, as is the discovery of resources by that metadata through the use of search engines. More recently, folksonomies have arisen as users have sought to share with others resources that they have discovered to be valuable with respect to a given topic. This has resulted in a whole new paradigm for how users search for information on the Web and represents a powerful shift in perception. Users can now base their assessment of a search result entry's worth based not on what the resource says its content and value are, but instead on how users of that resource feel about its contents and value.

In parallel with the development of resource-based folksonomies, Web users have looked for better ways to form communities. These communities may take many forms, but in most cases, all data associated with a person is generated by the person him or herself. Associations among people are represented typically by simple concepts, such as friendship, or at most by common interests. This has provided to you do this for innovators and researchers to begin thinking of people as resources.

There is a need for a way to form communities, or the like, of people based upon what others say about a person rather than upon what a person says about him or herself.

SUMMARY OF THE INVENTION

The present invention provides a method of and system for discovering people with attributes. According an embodiment of the method of the present invention, users tag people in their respective contact lists with attribute tags. The method aggregates in a folksonomy database the people tagged in the contact lists. A user may request a list of people tagged with an attribute. In response to a user request, the method searches the folksonomy database for people tagged with the attribute tag. The method returns to the requesting user a list of people tagged with the attribute tag.

In some embodiments of the present invention, aggregating includes forming a tagging table. The tagging table includes a tag column, a person identifier column, a value column, and a creator identifier column. The method receives a tagging message from a creator. The tagging message includes a tag, a person identifier, a value, and a creator identifier. The method determines if the tag in the tagging message is a new tag category. If so, the method creates a new tag category in the tagging table and adds the person identifier, value, and creator identifier of the tagging message to the tagging table. If the tag in the tagging message is not a new tag category, the method determines from the tagging table if the creator identifier has previously tagged the person identifier with the tag of the tagging message. If so, the method updates the tagging table with the value of the tagging message. If the creator identifier has not previously tagged the person identifier with the tag of the tagging message, the method adds the person identifier, value, and creator identifier of the tagging message to the tagging table. In some embodiments, the tagging table further includes a private column. If the tagging message is marked private, the method adds private to the tagging table.

Embodiments of the system of the present invention include a plurality of clients. Each client includes a contact list listing people. Each client further includes a folksonomy interface that enables a user to tag people listed in the contact list of the client with an attribute. An aggregation server is in communication with the clients. The aggregation server includes a folksonomy database. The aggregation server aggregates in the folksonomy database people tagged by users of the clients. The folksonomy interface of each client further enables a user to search the folksonomy database for persons tagged with an attribute.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
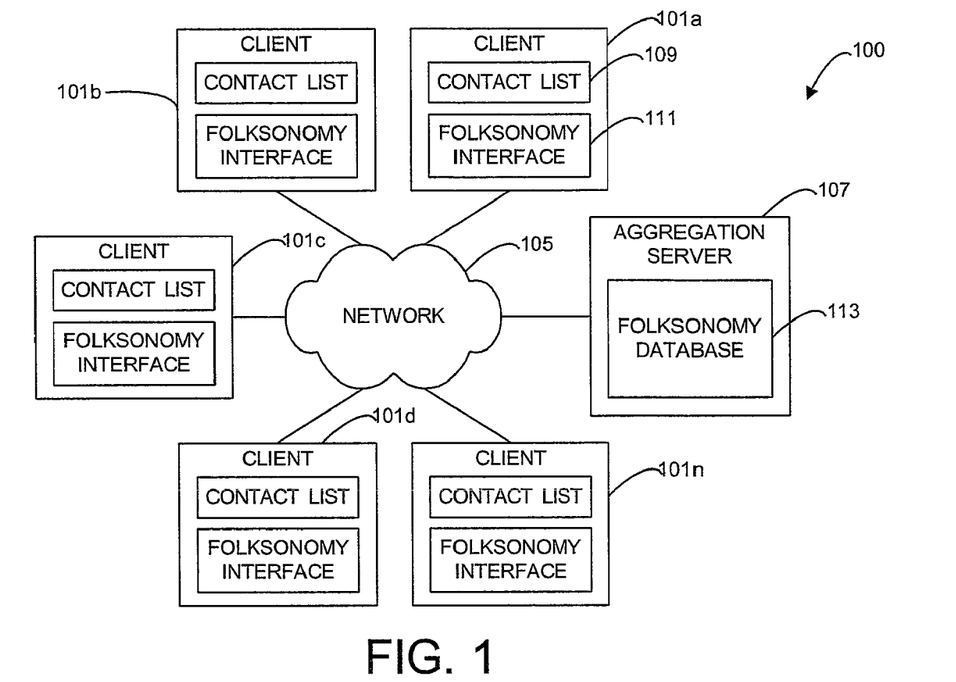
FIG. 1 is a block diagram of an embodiment of a system according to the present invention.

Referring now to the drawings, and first FIG. 1, an embodiment of a system according to the present invention is designated generally by the numeral 100. System 100 includes a plurality of clients 101. Clients 101 may be implemented in any suitable computer, such as a personal computer, a notebook computer, or the like.

Each client 101 includes a suitable network interface card (not shown) that enables client 101 to be connected to a network 105. Network 105 may be any suitable network such as token ring network, an Ethernet network, an Internet protocol network, or the like. Network 105 is coupled to an aggregation server 107. Thus, each client 101 may communicate with aggregation server 107.

Each client 101 includes a contact list 109. As is well known to those skilled in the art, a contact list comprises a listing of persons with whom a user of a client 101 communicates. Examples of clients 101 include chat clients, instant message clients, e-mail clients, cellular telephones, and the like; embodiments of the present invention may be applied to any list of people. System 100 may be mixed or heterogeneous in the sense that it may include clients of different types. For example, chat clients, instant message clients, e-mail clients, and other type clients may be include the same system. According to the present invention, each client 101 also includes a folksonomy interface 111.

Aggregation server 107 includes a folksonomy database 113. As will be explained in detail hereinafter, folksonomy database 113 includes a listing of persons tagged according to the present invention with various, preferably user-defined, attributes. The attributes may be areas of expertise, skills, or other things that characterize a particular person. Folksonomy interface 111 enables a user of a client 101 to tag persons in his or her contact list 109 with an attribute and to query a folksonomy database 113 to identify persons with attributes of interest. As will be apparent to those skilled in the art, aggregation server 107 is adapted to aggregate tagging data from any type of client 101 in system 100.

Figure 2:
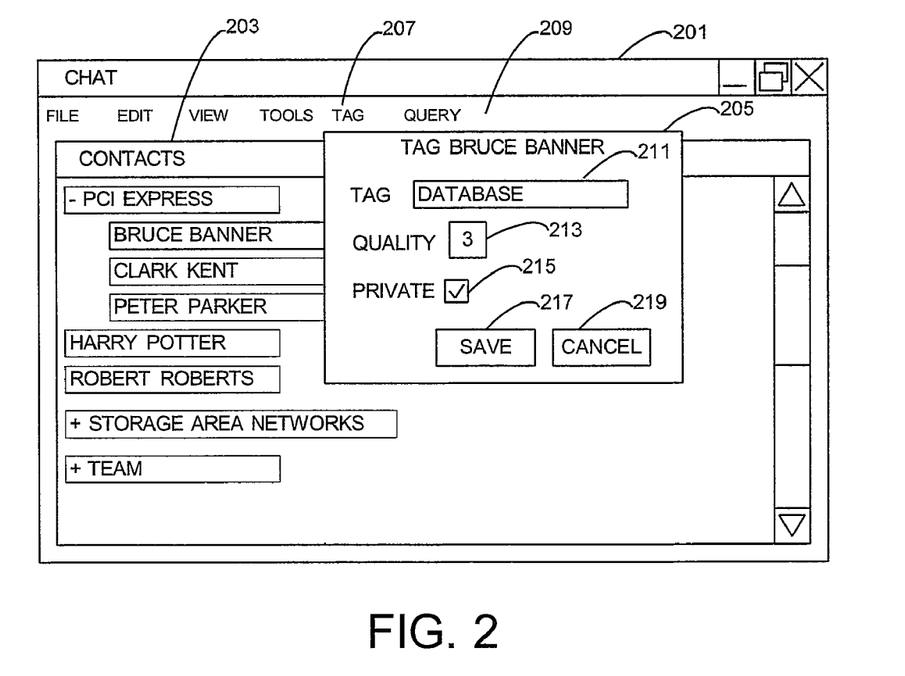
FIG. 2 is an illustration of an embodiment of a tagging window according to the present invention.

FIG. 2 illustrates an example of an embodiment of a client tagging window 201 according to the present invention. Tagging window 201 is a chat window. Tagging window 201 is illustrated displaying a contacts list 203. As shown in FIG. 2, contacts list 203 may be a tree structure, in which people may be displayed individually or as members of tag groups, affinity groups, organizational groups, or the like. In FIG. 2, PCI EXPRESS and STORAGE AREA NETWORKS are tag groups; TEAM is an organizational group.

Tagging window 201 is also illustrated displaying a tagging dialog 205. Tagging dialog 205 enables a user to tag a person in his or her contacts list 203. The tagging dialog 205 may be displayed by selecting a person to be tagged in selecting a tag option 207 from an action bar 209 of window 201 or by right-clicking on the person to be tagged. The tagging dialog 205 displays the name of the person to be tagged. The tagging dialog 205 includes a tag text entry box 211 into which a user may enter the tagging attribute. Tagging dialog 205 also includes a quality entry box 213 into which a user may enter a numerical quality value. In one embodiment of the present invention, the numerical quality value is a number from one to 10 that indicates the tagging user's perception or opinion of the degree to which the tagged person exhibits the tag attribute. For example, a quality value of 10 indicates that the tagged person has the highest degree of expertise in a particular field. Tagging dialog 205 also includes a private check box 215. Checking private checkbox 215 allows a user to keep the tag attribute and quality value of a particular individual private. A user might mark a tag private if the tag attribute or quality value is not particularly complementary to the tagged person. Tagging dialog 205 includes a save button 217. Actuation of save button 217 causes client 101 to send the information entered into tagging dialog 205 to aggregation server 107.

Figure 3:
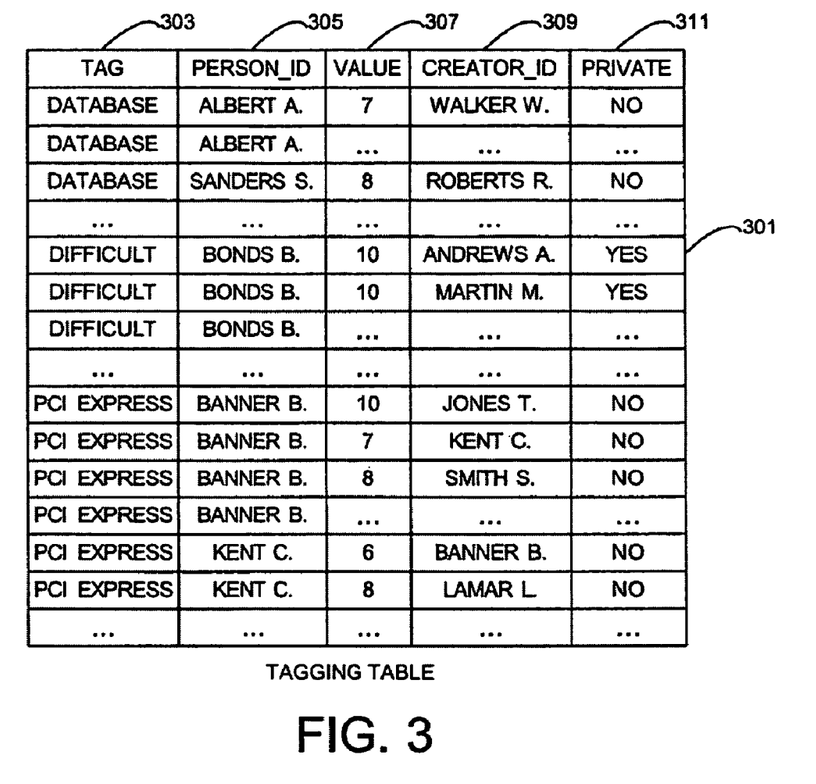
FIG. 3 is an illustration of an embodiment of a tagging table according to the present invention.

FIG. 3 illustrates an example of an embodiment of a tagging table 301 of folksonomy database 113. Table 301 includes a tag column 303, which lists tag attributes. Table 301 includes a person ID column 305, which lists persons associated with each tag of column 303. Table 301 also includes a value column 307, which lists the quality value assigned to a particular person for a particular tag attribute. Table 301 also includes a creator ID column 309, which identifies the user who tagged the person identified in column 305. Finally, table 301 includes a private column 311, which indicates whether a particular entry in table 301 has been marked private.

Figure 4:
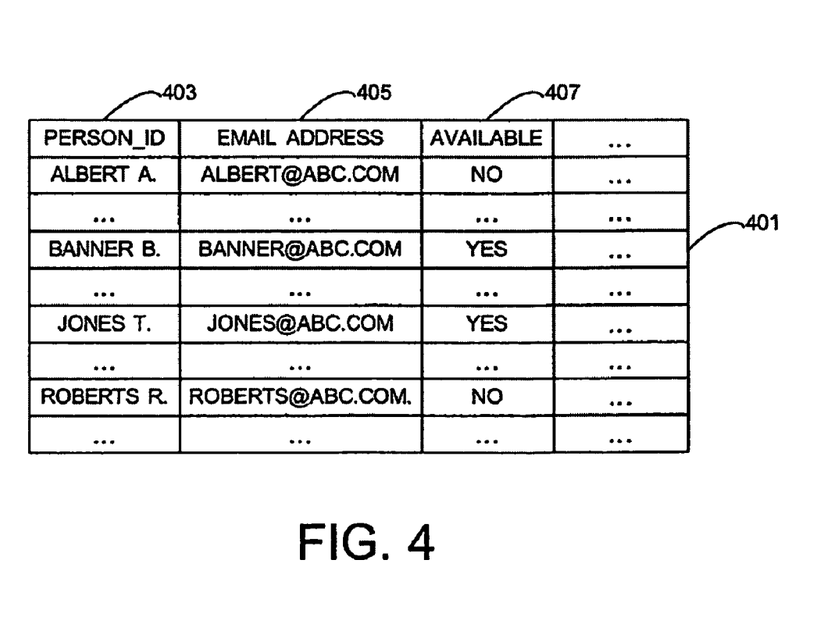
FIG. 4 is an illustration of an embodiment of a person data table according to the present invention.

FIG. 4 illustrates an example of an embodiment of a person data table 401. Person data table 401 includes a person ID column 403, which lists persons in an organization served by aggregation server 107. Person data table 401 also includes an e-mail address column 405, which lists the e-mail address of each person listed in person ID column 403. Table 401 also includes an availability column 407, which indicates whether or not a person listed in column 403 is available for chat or instant messaging.

Figure 5:
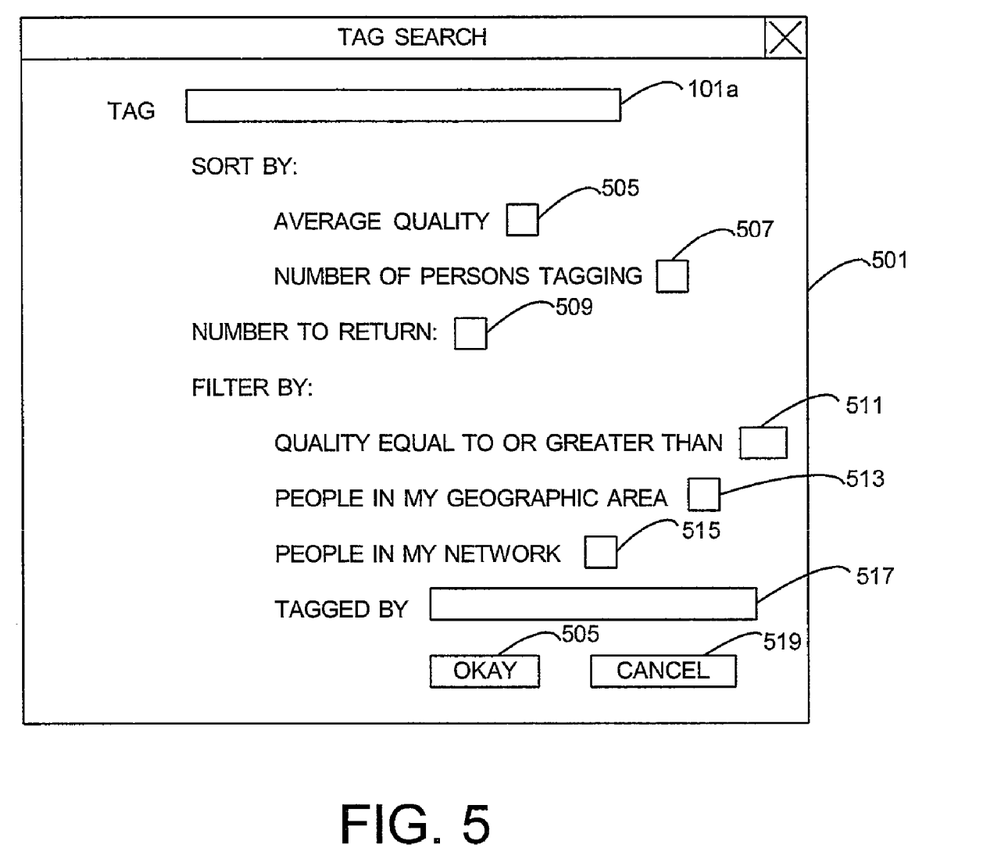
FIG. 5 is an illustration of an embodiment of a tag search window according to the present invention.

FIG. 5 illustrates an example of an embodiment of a tag search dialog 501 according to the present invention. Tag search dialog 501 is displayed to the user of the client 101. Text search dialog 501 includes a text entry field 503 into which a user may enter an attribute to be searched. Actuation of an OK button 505 causes a query to be submitted to aggregation server 107. Tag search dialog 501 may include check boxes whereby a user can specify how the results of a query may be sorted. In the illustrated embodiment, tag search dialog 501 includes a sort by average quality checkbox 505 and a sort by the number of persons tagging checkbox 507. As will be apparent to those skilled in the art, a tag search dialog may include controls for other sorting schemes.

Table 501 also includes a number to return entry box 509, into which the user may enter the number of search results to be returned. Table 501 may also include various filter controls. In the illustrated example, table 501 includes a filter by quality equal to or greater than entry box 511, which will limit the search results returned to those having user-specified quality values. Table 501 also includes a filter by people in my geographic area checkbox 513, which will limit the search results returned to those people in the requesting user's geographic area. Table 501 may also include a filter by people in my network checkbox 515, which will limit the search results returned to those people in the requesting user's network. Finally, tag search dialog 501 includes a TAGGED BY text entry box 517, into which a requesting user may enter the name or person ID of the particular person. Text entry box 517 enables a user to find out to whom a particular person has given a particular tag, which enables a user to perform recursive searches. For example, a user may wish to find the "experts' expert." As another example if a particular person is not available, the user may wish to find out who that person considers to be skilled in a particular area.

Those skilled in the art, given the benefit of this disclosure, will recognize other search criteria and filtering schemes that may be implemented in a tag search dialog according to the present invention. For example, a tag search dialog may include controls enabling a user to find people with an average tag quality rating greater than a user selected number, people associated with a given community, project, or activity, or other criteria. Additionally, searching according to the present invention may be implemented in an advanced user or free form embodiment, in which a user may construct custom queues.

Figure 6:
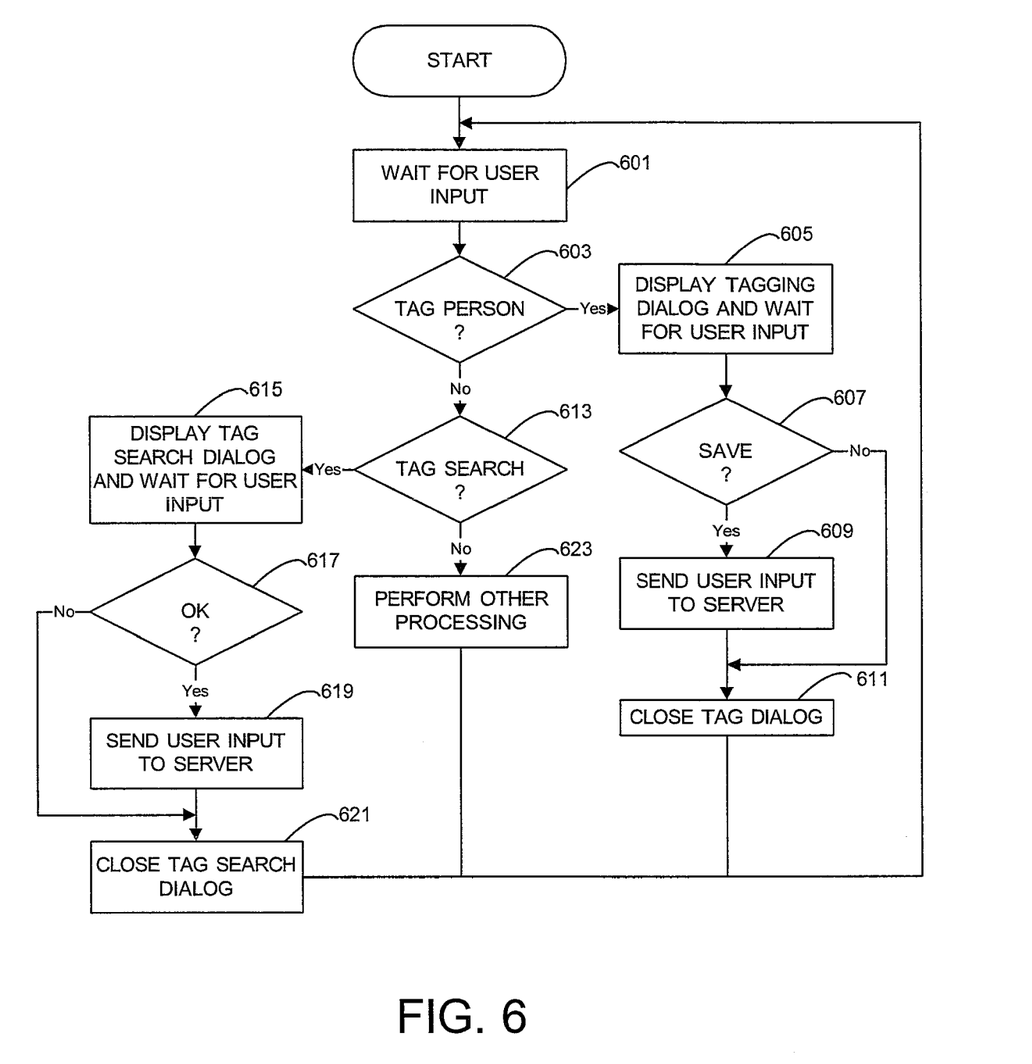
FIG. 6 is a flow chart of an embodiment of client tagging and tag searching according to the present invention; and, FIG. 7A and FIG. 7B comprise a flow chart of an embodiment server processing according to the present invention.

FIG. 6 is a flow chart of an embodiment of client processing according to the present invention. The system waits for user input, at block 601. If, as determined at decision block 603, the user input is that a person should be tagged, the system displays a tagging dialog such as tagging dialog 205 of FIG. 2, and waits for user input, as indicated at block 605. User input includes supplying the information requested in tagging dialog 205 and actuating either save button 217 or cancel button 219. If, as determined at decision block 607, the user input is save, the system sends the user input to the aggregation server 107, as indicated at block 609. Then, the system closes the tagging dialog, at block 611, and processing returns to block 601. If, as determined at decision block 607, the user input is not save, processing proceeds to block 611. Referring back to decision block 613, if the user input is not tag search, the system performs other user input processing, as indicated generally at block 623.

Returning to decision block 603, if the user input is not tag a person, the system determines, at decision block 613, if the user input is tag search. If so, the system displays a tag search dialog, such as tag search dialog 501 of FIG. 5, and waits for user input, as indicated at block 615. User input comprises filling out tag search dialog 501 and actuating either OK button 505 or cancel button 519. If, as determined at decision block 617, the user input is save, the system sends the user input to aggregation server 107, as indicated at block 619. Then, the system closes the tag search dialog, at block 621, and processing returns to block 601. If, as determined at decision block 617, the user input is not OK, processing proceeds to block 621.

Figure 7A:
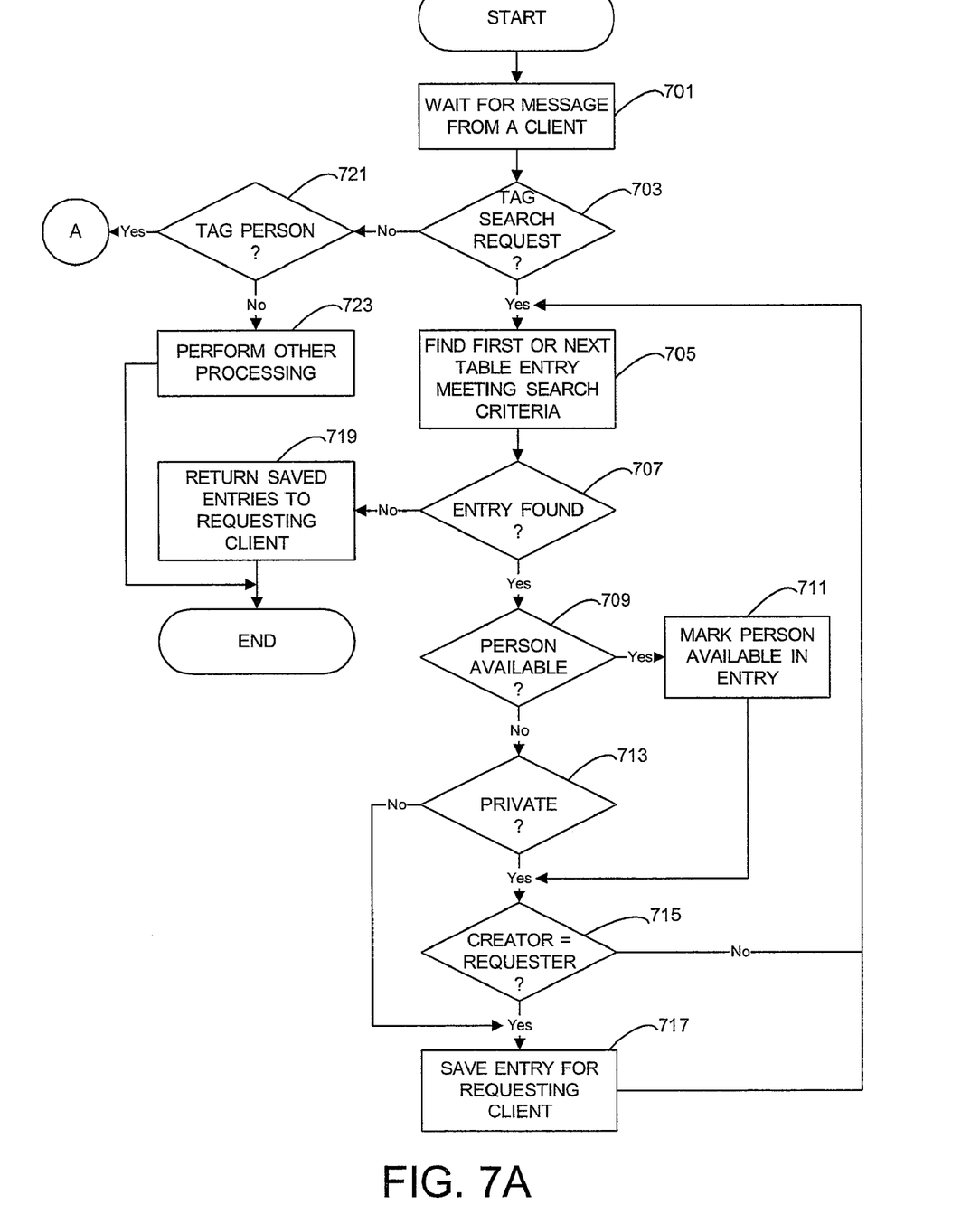
Figure 7B:
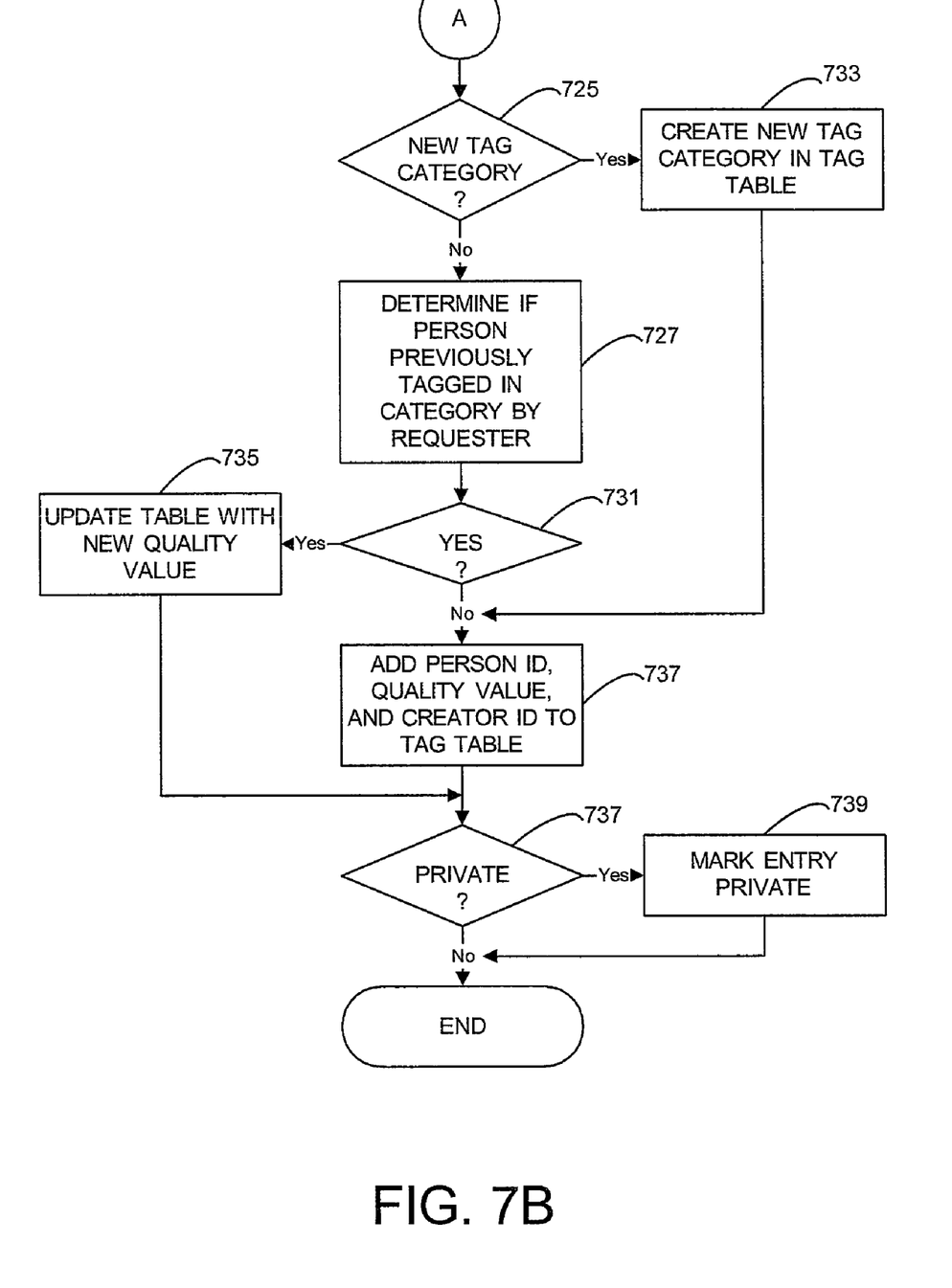

FIGS. 7A and 7B comprise a flow chart of an embodiment of aggregation server processing according to the present invention. The system waits for a message from a client, at block 701. If, as determined at decision block 703, the message is a tag search requests, the system finds the first table 301 entry meeting the search criteria, as indicated at block 705. If, as determined at decision block 707, an entry meeting the search criteria is found, the system determines, at decision block 709 if the person of the entry is available. The determination whether or not to person is available is made with reference to table 401 of FIG. 4. If so, the system marks the person available in the entry, as indicated at block 711. If, as determined at decision block 709, persons not available, the system determines, at decision block 713, if the entry is marked private. If so, the system determines at decision block 715, if the creator of the entry is the requester. If so, the system saves the entry for the requesting client, at block 717, and returns to block 705. If, as determined at decision block 715, the creator of the entry is not the requester, processing skips block 717 and returns to block 705. Thus, processing loops through blocks 705-717 until, as determined at decision block 707, no more entries are found, at which point the system returns to save entries to the requesting client, at block 719, and processing ends.

Returning to decision block 703, if the message from the client is not a tag search request, the system determines, at decision block 721, if the message is a tag person message. If not, the system performs other client message processing, as indicated generally at block 723. If, as determined at decision block 721, the message is a tag person message, processing proceeds to FIG. 7B.

Referring to FIG. 7B, the system determines, at decision block 725, if the message contains a new tag category. If not, the system determines, by inspection of table 301, if the requester has previously tagged the person with the same tag, at block 727. If, as determined at decision block 729, the requester has not previously tagged the person in the category of the request, the system adds the person ID, quality value, and creator ID to the tag table 301, at block 731. Returning to decision block 725, if the request does contain a new tag category, the system creates a new tag category in table 301, as indicated at block 733, and processing proceeds to block 731. Returning to decision block 729, if the requester has previously tagged the person of the request in the same category, the system updates table 301 with the quality value of the request, as indicated at block 735. After processing at block 731 or 735, the system determines, at decision block 737, if the requester has indicated that the tag is private. If so, the system marks the entry private, at block 739, and processing ends. While FIG. 7B illustrates an embodiment in which a tag request includes only a single tag, those skilled in the art will recognize that a person may be tagged with multiple tags in the same request.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A method of aggregating and discovering people with one or more attributes, the method comprising:
in response to receipt of a request to tag a person identifier (ID) within a contact list with an attribute tag, tagging the person ID with the attribute tags in each of a plurality of contact lists belonging to a plurality of clients;
assigning a quality value to one or more of the attribute tags for the person ID in each of the plurality of contact lists, wherein the quality value is a numerical value that indicates a degree of expertise of a person identified by said person ID in a particular field represented by an associated attribute;
aggregating, in a community database, person IDs tagged with attribute tags from said plurality of contact lists belonging to said plurality of clients, wherein only person IDs that are tagged with an attribute tag are placed within the community database, wherein said aggregating further comprises:
receiving a tagging message from a creator, said tagging message including a tag, a person ID, a value, and a creator identifier (ID), wherein the creator ID identifies said creator;
determining whether the tag in said tagging message is for a new tag category; and
in response to determining that said tag in said tagging message is for a new tag category: creating the new tag category in a tagging table; and adding the person ID, value, and the creator ID of said tagging message to the new tag category in said tagging table;
receiving a request for a list of person IDs tagged with a particular attribute; and
in response to said receiving:
searching said community database for person IDs tagged with said particular attribute; and
returning to a requester a list of person IDs tagged with said particular attribute.

2. The method as claimed in claim 1, wherein said tags are user defined and wherein the community database is a relational database configured similar to a community database.

3. The method as claimed in claim 1, further comprising responsive to receiving an entry in a tagging dialog that indicates the tag attribute and quality value of a person ID is to be private, marking a tagged person ID private in said community database.

4. The method as claimed in claim 3, further comprising:
in response to determining that a tagged person ID is marked private in said community database, returning information about a person identified by said tagged person ID only to a person who marked said tagged person ID private and preventing a return of any information about the person to another person who is not the person who marked the tagged person ID as private.

5. The method as claimed in claim 1, wherein said aggregating comprises creating the tagging table, said tagging table comprising a tag column, a person ID column, a value column, and a creator identifier column.

6. The method as claimed in claim 1, wherein said aggregating further comprises:
in response to determining that said tag in said tagging message is not a new tag category, determining from said tagging table if said creator identified by said creator ID has previously tagged said person ID with said tag of said tagging message; and in response to determining that said creator identified by said creator ID has previously tagged said person ID with said tag of said tagging message, updating an entry of said tagging table with the value of said tagging message.

7. The method as claimed in claim 6, wherein said aggregating further comprises:
in response to determining that said creator identified by said creator ID has not previously tagged said person ID with said tag of said tagging message, adding the person ID, value, and creator identifier of said tagging message to said tagging table.

8. A system comprising:
an aggregation server configured for communicating with a plurality of clients, each client including (a) a contact list that lists people according to person IDs and (b) an interface enabling tagging of person IDs listed in said contact list of the client with an attribute and assigning of a quality value to a tagged person ID, said aggregation server including a community database, said aggregation server aggregating into said community database information associated with person IDs tagged at said clients, wherein the aggregation server:
in response to receipt of a request to tag a person identifier (ID) within said contact list with an attribute tag, tags the person ID with the attribute tags in each of a plurality of contact lists belonging to the plurality of clients;
assigns a quality value to one or more of the attribute tags for the person ID in each of the plurality of contact lists, wherein the quality value is a numerical value that indicates a degree of expertise of a person identified by said person ID in a particular field represented by an associated attribute;
aggregates, in the community database, person IDs tagged with attribute tags from said plurality of contact lists belonging to said plurality of clients, wherein only person IDs that are tagged with an attribute tag are placed within the community database,
wherein said aggregation server further:
creates a tagging table, said tagging table comprising a tag column, a person ID column, a value column, and a creator identifier (ID) column;
receives a tagging message from a creator, said tagging message including a tag, a person ID, a value, and a creator identifier (ID), wherein the creator ID identifies said creator;
determines whether the tag in said tagging message is for a new tag category; and
in response to determining that said tag in said tagging message is for a new tag category: creates the new tag category in said tagging table; and adds the person ID value, and the creator ID of said tagging message to the new tag category in said tagging table;
receives a request for a list of person IDs tagged with a particular attribute; and
in response to said receiving: searches said community database for person IDs tagged with said particular attribute; and returns to a requester a list of person IDs tagged with said particular attribute.

9. The method as claimed in claim 1, further comprising:
receiving a request to search said community database for person IDs having a quality value equal to or greater than a minimum quality value; and
returning search results limited to only those person IDs in said community database having a quality value equal to or greater than said minimum quality value;
wherein said quality value indicates a degree of perception that a person associated with the person ID exhibits the associated attribute as determined by the person who marked said tagged person ID, and wherein said quality value includes a privacy tag that when marked indicates said quality value is private.

10. The method as claimed in claim 6, wherein said tagging table further includes a private column, and said aggregating further comprises:
in response to determining that said tagging message is marked private, adding a private indicator to an entry of said tagging table in which entry the person ID is placed within the tagging table.

11. The system as claimed in claim 10, wherein said interface further enables searching of said community database for persons having person IDs tagged with an attribute and wherein the community database is a relational database configured similar to a community database.

12. The system as claimed in claim 10, wherein said interface further enables marking of a tagged person ID private.

13. The system as claimed in claim 12, wherein:
said interface further enables searching of said community database for persons within person IDs tagged with an attribute; and
said aggregation server is adapted to return information about a person identified by a tagged person ID marked private only to the person that marked said tagged person ID private.

14. The system as claimed in claim 10, wherein the aggregation server further:
in response to receiving an entry in a tagging dialog that indicates the tag attribute and quality value of a person ID is to be private, marks a tagged person ID private in said community database; and
in response to a tagged person ID in said community database being marked private, returns information about a person identified by said tagged person ID only to a person who marked said tagged person ID private.

15. The system as claimed in claim 10, wherein said aggregation server that aggregates person IDs tagged with attribute tags further:
in response to determining that said tag in said tagging message is not a new tag category, determines from said tagging table whether said creator identified by said creator ID has previously tagged said person ID with said tag of said tagging message; and
in response to determining that said creator identified by said creator ID has previously tagged said person ID with said tag of said tagging message, updates an entry of said tagging table with the value of said tagging message.

16. The system as claimed in claim 15, wherein said aggregation server that aggregates person IDs tagged with attribute tags further:
in response to determining that said creator identified by said creator ID has not previously tagged said person ID with said tag of said tagging message, adds the person ID value, and creator ID of said tagging message to said tagging table.

17. The system as claimed in claim 10, wherein said tagging table further includes a private column, and said aggregation server that aggregates person IDs tagged with attribute tags further:
in response to said tagging message being marked private, adds a private indicator to an entry of said tagging table in which entry the person ID is placed within the tagging table.

18. The system as claimed in claim 10, wherein the aggregation server further:
  receives a request to search said community database for person IDs having a quality value equal to or greater than a minimum quality value; and
  returns search results limited to only person IDs in said community database having a quality value equal to or greater than said minimum quality value;
wherein said quality value indicates a degree of perception that a person associated with the person ID exhibits the associated attribute as determined by the person who marked said tagged person ID, and wherein said quality value includes a privacy tag that when marked indicates said quality value is private.

\* \* \* \* \*